(12) United States Patent
Kondo

(10) Patent No.: US 6,233,068 B1
(45) Date of Patent: May 15, 2001

(54) DIGITAL COPYING SYSTEM AND IMAGE READING APPARATUS

(75) Inventor: Masao Kondo, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/130,988

(22) Filed: Aug. 7, 1998

(30) Foreign Application Priority Data

Aug. 8, 1997 (JP) .................................................... 9-215353

(51) Int. Cl.[7] .................................................... H04N 1/04
(52) U.S. Cl. ........................ 358/498; 358/496; 358/451; 358/412
(58) Field of Search .................................. 358/449, 451, 358/452, 498, 496, 497, 401, 474, 296, 412; 399/396

(56) References Cited

U.S. PATENT DOCUMENTS

| | | | |
|---|---|---|---|
| 3,603,727 | * 9/1971 | Kinugawa et al. | 178/6.7 R |
| 4,139,298 | * 2/1979 | Tani et al. | 355/8 |
| 4,579,327 | * 4/1986 | Furuichi et al. | 271/3.1 |
| 4,771,473 | 9/1988 | Sugiura | 382/298 |
| 4,782,371 | * 11/1988 | Yokota et al. | 355/77 |
| 5,079,624 | * 1/1992 | Sasuga et al. | 358/456 |
| 5,257,064 | * 10/1993 | Okamoto et al. | 355/24 |
| 5,461,468 | 10/1995 | Dempsey et al. | 399/396 |
| 5,995,801 | * 11/1999 | Katsuta et al. | 358/496 |

* cited by examiner

Primary Examiner—Cheukfan Lee
(74) Attorney, Agent, or Firm—Morrison & Foerster LLP

(57) ABSTRACT

A digital copying machine which feeds a document picked up from a tray or inserted in a manual feed tray to an image reading section. The machine is operable in a first mode in which a document is fed at a speed to achieve the registered copying magnification and in a second mode in which a thin paper document is fed at a lower speed than the speed to achieve the copying magnification.

10 Claims, 9 Drawing Sheets

F I G. 1
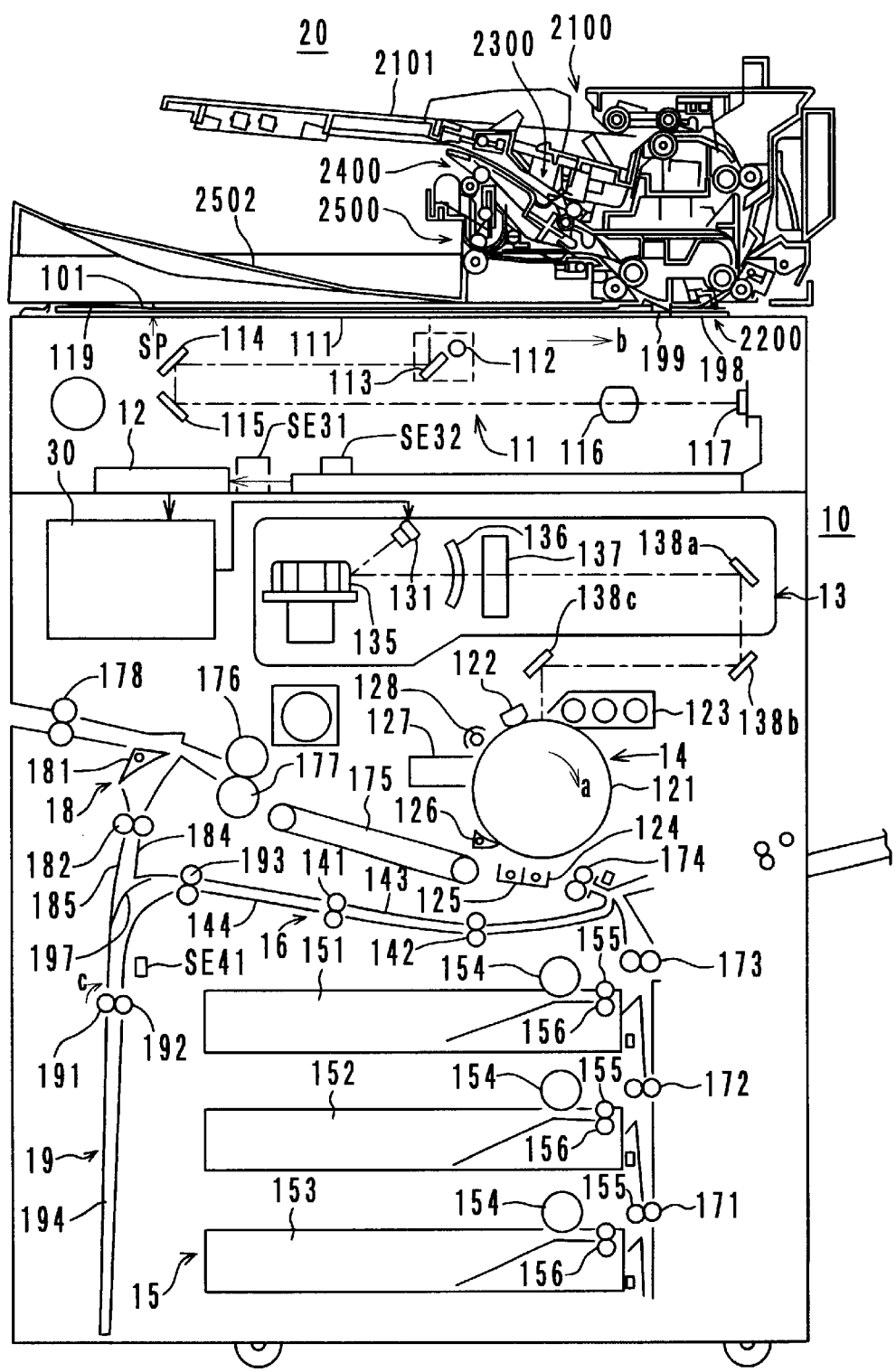

F I G. 8
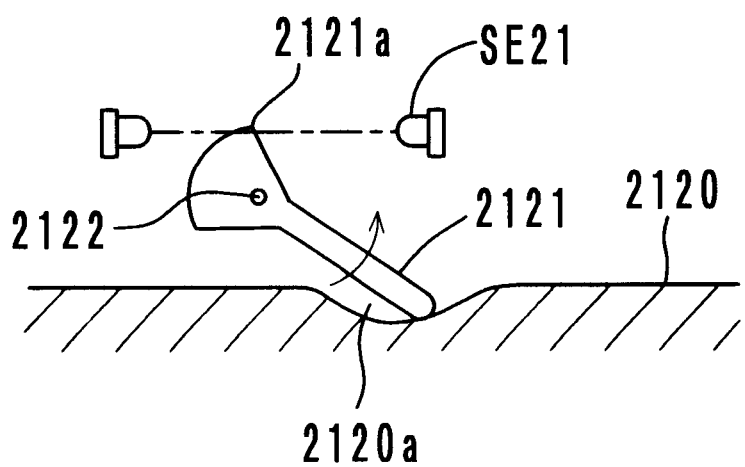

DIGITAL COPYING SYSTEM AND IMAGE READING APPARATUS

This application is based on application No. 9-215353 filed in Japan, the contents of which are hereby incorporated by reference.

BACKGROUND OF THE INVENTION

1. Field of the Invention

The present invention relates to a digital copying system and an image reading apparatus, and more particularly to a digital copying system which reads an image of a document while feeding the document with an automatic document feeder, carries out digital processing toward the image data and reproduces the image on a sheet.

2. Description of Related Art

In the art of electrophotographic copying system, it is generally known as a document-feeding image reading method to read an image of a document with a scanner which is set at an image reading position while feeding the document over the image reading position. In such a copying system adopting the document-feeding image reading method, the speed of feeding a document is varied in accordance with the copying magnification so as to achieve the registered magnification in the sub scanning direction. The magnification in the main scanning direction is varied by varying the movement of the optical system of the scanner.

In the document-feeding image reading method, the speed of feeding a document is gained more to achieve a smaller copying magnification, and in such a case, a large load is applied to a document from the transport rollers. Especially when a thin paper document such as a slip, a duplicate or the like is fed, there is fear that the document may be damaged.

SUMMARY OF THE INVENTION

It is an object of the present invention to provide a digital copying system which inhibits the load on a document from the transport rollers so as not to damage the document.

In order to attain the object, a digital copying system according to the present invention comprises: an automatic document feeder for feeding a document set on a tray to a specified reading position; image reading means for reading an image of the document fed by the automatic document feeder at the reading position; image processing means for carrying out digital processing toward data read by the image reading means to produce print data; image forming means for forming an image on a sheet in accordance with the print data produced by the image processing means to reproduce the image of the document; magnification setting means for setting a copying magnification; and control means. The control means controls the automatic document feeder to operate in a first document feed mode to feed a document on the reading position at a speed to achieve the set copying magnification and in a second document feed mode to feed a document on the reading position at a speed different from the speed to achieve the set copying magnification.

In the first document feed mode, the automatic document feeder operates in the ordinary document-feeding image reading method. In this mode, the speed of feeding a document depends on the set copying magnification, and the smaller the copying magnification is, the higher the feed speed is. The second document feed mode is for a fragile thin paper document, and in this mode, it is possible to feed a document at a speed different from the speed to obtain the set copying magnification. Preferably, by lowering the feed speed, the load on the thin paper document applied from the transport rollers, etc. is lightened, and the document can be protected.

In the second document feed mode, because a document is fed for image reading at a speed different from the speed to obtain the set copying magnification, it is required to process the read data to have correct information on magnification so that the image of the document can be reproduced at the set copying magnification. Such processing can be carried out by the image processing means.

Also, in the second document feed mode, it is not always necessary to differ the feed speed, but it is sufficient to differ the feed speed only when the set copying magnification is such a value that a thin paper document must be fed at such a high speed to cause damage on the document. Specifically, when the set copying magnification is within a first range covering comparatively large magnifications, the feed speed is set to a value to obtain the copying magnification, and when the set copying magnification is within a second range covering comparatively small magnifications, the feed speed is set lower than the speed to obtain the set copying magnification. With this arrangement, it is avoided to lower the copying productivity unnecessarily.

Further, it is possible to provide inputting means which enables an operator to command execution of the second document feed mode. Also, it is possible to provide detecting means for detecting whether a document is thin paper or not so that operation in the second document feed mode can be automatically executed when the document is judged to be thin paper. Moreover, the automatic document feeder may be so structured as to operate in a mode in which every time a document is set on a tray, the automatic document feeder automatically feeds the document to the reading position, and execution of the second document feed mode may be associated with this mode.

BRIEF DESCRIPTION OF THE DRAWINGS

This and other objects and features of the present invention will be apparent from the following description with reference to the accompanying drawings, in which:

FIG. 1 is a sectional view of a digital copying machine according to the present invention, showing its structure;

FIG. 8 is a sectional view of a thin paper detection mechanism; and

DETAILED DESCRIPTION OF THE PREFERRED EMBODIMENTS

Figure 2:
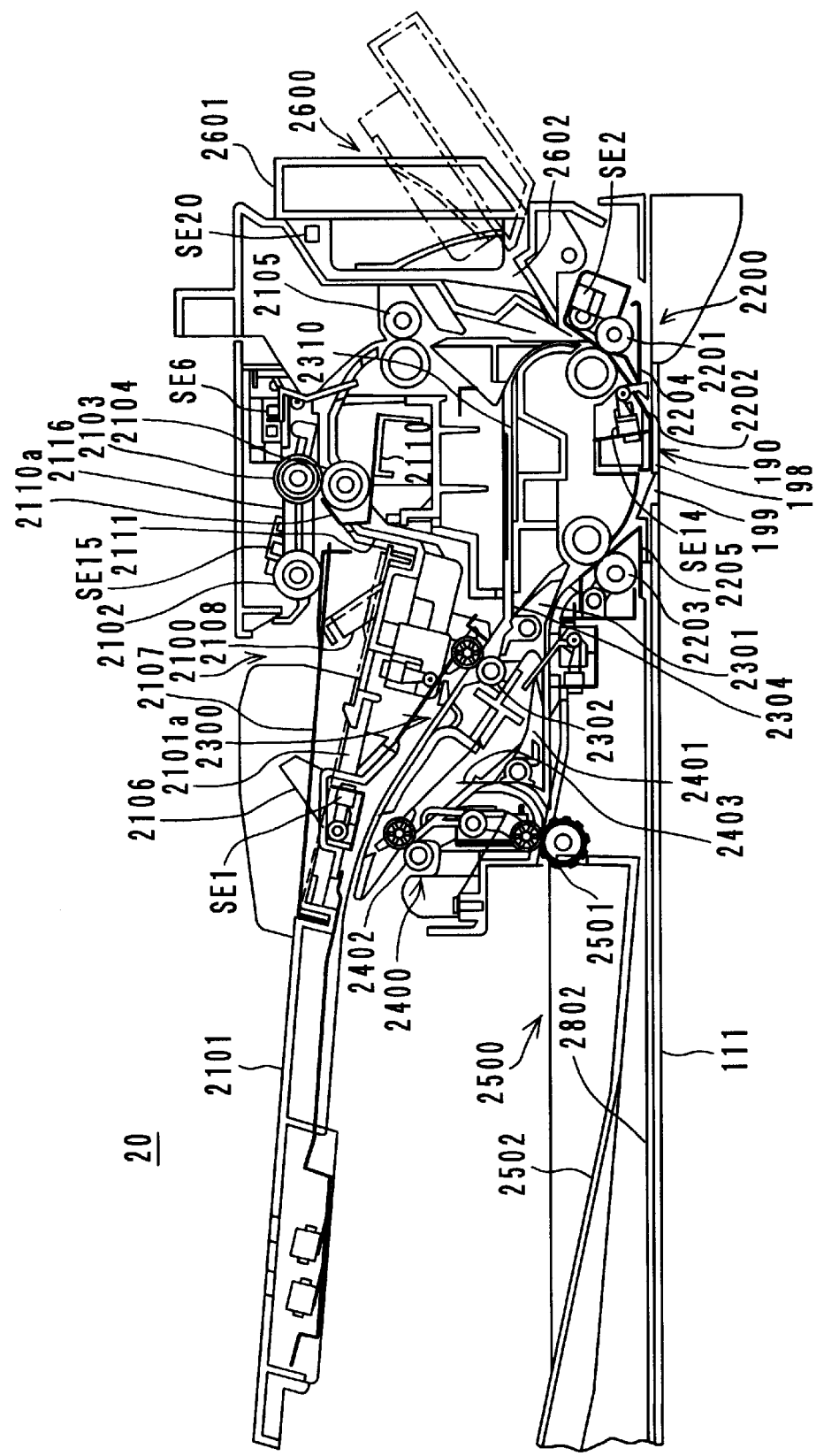
FIG. 2 is a sectional view of an automatic document feeder, showing its internal structure.

A digital copying system and an image reading apparatus according to the present invention are described with reference to the accompanying drawings.

General Structure of Copying Machine

A copying machine 10 mainly comprises an image reading optical system 11, a laser optical unit 13, an image forming section 14 and a sheet feeding section 15.

Image Reading Optical System

The image reading optical system 11 is located right under a platen glass 111 which is the top surface of the copying machine 10. The optical system 11 comprises a lamp 112 for irradiating a document which is set on the platen glass 111 or is fed by an automatic document feeder 20 which will be described later, reflection mirrors 113, 114 and 115, a lens 116 with a function of varying magnification, a CCD sensor 117, and a shading correction plate 119 which is located on the platen glass 111 so as to correct variations in the sensitivity of the CCD sensor 117.

A document scale 101 is disposed at the left end of the platen glass 111 so that an operator can set a document on the platen glass 111 in a right position. While lifting up the automatic document feeder 20, an operator sets a document on the platen glass 111 putting the document face down and matching one end of the document to the document scale 101. The image reading optical system 11 reads the image of the document which has been manually set on the platen glass 111 in the following way: while the lamp 112 is irradiating the document, the lamp 112 and the mirrors 113, 114 and 115 move in a direction indicated by arrow "b" to scan the image of the document; and the scanned light is focused on the CCD sensor 117 through the lens 116, whereby the image is read by the CCD sensor 117. The CCD sensor 117 first reads a light reflected from the shading correction plate 119 so as to correct variations in sensitivity among elements of the sensor 117. Thereafter, scanning of the document image is started at a document reference position SP.

The lamp 112 and the mirror 113 move in the direction of arrow "b" at a speed of V/m, wherein V is the circumferential speed of a pohotosensitive drum 121 (constant regardless of the copying magnification) and m is the copying magnification. Meanwhile, the mirrors 114 and 115 move in the direction of arrow "b" at a speed of V/2m. Thereby, scanning for image reading is carried out while the optical path length is kept constant.

Also, a slit glass 198 is disposed at the right end of the platen glass 111 so that the image of a document which is fed at a constant speed by the automatic document feeder 20 can be read. In this case of document-feeding image reading, the lamp 112 and the mirror 113 are set stationary under the slit glass 198, and the mirrors 114 and 115 are set stationary at such positions to make a necessary optical path length. While the lamp 112 is irradiating a document which passes over the slit glass 198 at a constant speed (which depends on the copying magnification m), the CCD sensor 117 reads the image of the document. A guide plate 199 is provided at the left end of the slit glass 198 to pick up a document from the slit glass 198. In this case, the above-mentioned shading correction is carried out before image reading.

Laser Optical Unit

The image read by the CCD sensor 117 is reproduced on the photosensitive drum 121 as an electrostatic latent image through the laser optical unit 13. More specifically, image data read by the CCD sensor 117 are processed in an image processing section 12, and the processed data are sent to a control section 30 as print data. Then, the laser diode 131 is modulated in accordance with the print data controlled by the control section 30. A laser beam emitted from the laser diode 131 is deflected by a polygon mirror 135 which rotates at a high speed, and the deflected light passes through a troidal lens 136 and an fθ lens 137 and is focused on the photosensitive drum 121 via reflection mirrors 138a, 138b and 138c.

Moreover, in an SADF mode and in a thin paper mode which will be described in detail later, the image processing section 12 executes image processing to make up for adjustment of the speed of feeding a document (magnifying process in the sub scanning direction), independently of image processing to process the image data read by the CCD sensor 117 into data which matches the registered copying magnification (magnifying processes in the main scanning direction and in the sub scanning direction).

Image Forming Section

In the image forming section 14, around the photosensitive drum 121, the followings are provided in order in a direction indicated by arrow "a" which is the direction of rotation of the photosensitive drum 121: an electrifying charger 122, a developing device 123, a transfer charger 124, an erasing charger 125, a sheet separating pawl 126, a residual toner cleaner 127 and a residual charge eraser 128. Since the structures and operations of these elements are well known, the descriptions thereof are omitted.

Sheet Feeding Section

The copy sheet feeding section 15 comprises cassettes 151, 152 and 153, sheet transport paths, etc. The cassettes 151, 152 and 153 are disposed on three different levels, and a pick-up roller 154, a feed roller 155 and a separation roller 156 are provided to each of the cassettes 151, 152 and 153.

The size of a document which has been set on the platen glass 111 manually is detected by reflection type sensors SE31 and SE32. According to the detected size, a cassette which contains sheets of an optimal size is selected from the cassettes 151, 152 and 153, and sheets are fed out of the selected cassette one by one in response to a feed signal. A sheet fed out of the cassette is transported upward by transport rollers 171, 172 and 173 and is stopped at timing rollers 174. Then, the timing rollers 174 are rotated in synchronization with an image formed on the photosensitive drum 121, whereby the sheet is fed to a transfer section.

The sheet receives a toner image at the transfer section, and immediately the sheet is separated from the photosensitive drum 121 and is fed between fixing rollers 176 and 177 by a conveyer belt 175, where the toner image is fixed on the sheet. Then, the sheet is discharged from the copying machine to a tray or to a sorter through discharge rollers 178.

Further, the copying machine 10 has a transport section 18 which diverges at a point immediately before the discharge rollers 178, a switchback section 19 and a refeeding section 16. The transport section 18 comprises a diverter 181, transport rollers 182 and sheet guide plates 184 and 185. The switchback section 19 comprises a transport roller 191 which is capable of rotating forward and in reverse, a roller 192 which follows the transport roller 191, transport rollers 193, a sheet guide plate 194 and a sheet sensor SE41. At the border between the transport section 18 and the switchback section 19, a flexible resin film 197 is provided to prevent a sheet from traveling backward. The refeeding section 16 comprises transport rollers 141 and 142, and sheet guide plates 143 and 144.

In a duplex copy mode, the diverter 181 pivots counterclockwise slightly from the position indicated by the solid line in FIG. 1, and in this state, a copy sheet which has obtained an image on its first side is directed to the switchback section 19 through the transport section 18. When the leading edge of the copy sheet is detected by the sensor SE41, the transport roller 191 is driven to rotate forward, that is, in a direction indicated by arrow "c". Thereafter, when the trailing edge of the copy sheet is detected by the sensor SE41, the rotation of the transport roller 191 is reversed. Thereby, the copy sheet is inverted upside down and leading edge trailing, and is transported to the refeeding section 16 guided by the resin film 197. Then, the copy sheet is refed to the timing rollers 174. The copy sheet obtains an image on its second side and is discharged from the copying machine 10 through the discharge rollers 178.

Copy Mode

In combination with the automatic document feeder 20, the copying machine 10 is basically operable in an APS mode, an AMS mode and a manual mode. In the APS (automatic paper selection) mode, the size of a copy sheet is automatically determined based on the detected size of a document and the copying magnification registered by an operator. In the AMS (automatic magnification selection) mode, the copying magnification is automatically determined based on the detected size of a document and the copy sheet size registered by an operator. In the manual mode, regardless of the size of a document, copying is carried out according to the copying magnification and the copy sheet size registered by an operator.

Moreover, because the copying machine 10 is capable of processing print data in the laser optical unit 13 after reading an image of a document with the reading optical system 11 and memorizing the image in the image processing section 12, the copying machine 10 is capable of forming a rotated image and forming an image in a two-in-one mode and in a four-in-one mode. More specifically, even if the set direction of a copy sheet is different from the set direction of a document, the copying machine 10 is capable of rotating the read and memorized image by 90 degrees on a horizontal plane so as to match the direction of the image to the direction of the copy sheet. The two-in-one mode is to reproduce images of two documents on one copy sheet, and the four-in-one mode is to reproduce images of four documents on one copy sheet.

General Structure of Automatic Document Feeder

As FIG. 2 shows, the automatic document feeder 20 is composed mainly of the following sections:

a feeding section 2100 which comprises a document tray 2101, a pick-up roller 2102, a feed roller 2103, a separation roller 2104 and a pair of intermediate transport rollers 2105;

a reading section 2200 which comprises a first pair of read rollers 2201, a pressing guide plate 2202, a second pair of read rollers 2203, an entrance side guide plate 2204 and an exit side guide plate 2205;

a circulation inverting section 2300 which comprises a diverter 2301, a pair of circulation inversion rollers 2302 and a circulating path 2310;

a discharge inverting section 2400 which comprises a diverter 2401 and a pair of discharge inversion rollers 2402;

a discharging section 2500 which comprises a pair of discharge rollers 2501 and a discharge tray 2502;

a manual feeding section 2600 which comprises a manual feed tray 2601 and a manual feed port 2602; and a document pressing plate 2802 which presses a document has been manually set on the platen glass 111.

The automatic document feeder 20 is operable in a simplex document mode to read the image of a simplex document (a document with an image on only one side), in a duplex document mode to read both images of a duplex document (a document with images on both sides) and in an SADF mode to feed documents inserted through the manual feed port 2600 one by one.

Feeding Section

The document tray 2101 has a tilting portion 2101a at its bottom half, and a leading edge regulating plate 2111 is provided at the end of the tilting portion 2101a. A lift-up plate 2107 is attached to the document tray 2101 in such a way to be capable of pivoting up and down on its own left end, and the lift-up plate 2107 is initially on a level with the tilting portion 2101a.

A set of documents are placed on the tray 2101 with the leading edge in contact with the regulating plate 2111. The lift-up plate 2107 moves up following a drive lever 2108 which is moved upward by a lift-up motor. Thereby, the upper surface of the set of documents comes into contact with the pick-up roller 2102. The pick-up roller 2102 is capable of pivoting on a shaft of the feed roller 2103 via an arm 2116 and is pulled downward by its own weight and a spring (not shown). The pick-up roller 2102 is lifted up by the lift-up plate 2107 which moves up following the drive lever 2108, and when it is detected by an upper limit sensor SE15 that the arm 2116 has pivoted up to a specified position, the drive lever 2108 is stopped. The state of the upper limit sensor SE15 is monitored at all times, and when the sensor SE15 comes to a non-detecting state because the pick-up roller 2102 moves down, the drive lever 2108 is moved up so as to move up the lift-up plate 2107. In this way, the pick-up roller 2102 is kept on a specified level and picks up documents with a specified pressure constantly. Thereby, the leading edge of documents comes into contact with a pre-separating guide tab 2110a from the specified height at a specified angle constantly regardless of the volume of the rest of documents, which results in stable feeding.

The pre-separating guide tab 2110a is attached to a holder 2110 and extends upward from the upper end of the leading edge regulating plate 2111 so that the end of the pre-separating guide tab 2110a is close to the nip portion between the feed roller 2103 and the separation roller 2104 with a slight gap. Although some documents are fed by the pick-up roller 2102 at a time, when the leading edge of the documents come into contact with the pre-separating guide tab 2110a, the documents are so guided that the upper documents will come forward. Thereby, a few documents comes to the nip portion between the rollers 2103 and 2104.

The feed roller 2103 is driven to rotate counterclockwise and transports the uppermost of the documents fed between the rollers 2103 and 2104 to the right. Meanwhile, the other documents are prevented from traveling forward by the roller 2104. The feed roller 2103 is driven to rotate in a regular position shown in FIG. 2. The separation roller 2104 is supported by the holder 2110 in such a way to rotate freely and is pulled by a spring (not shown) via the holder 2110 so as to be elastically in contact with the feed roller 2103. A torque limiter is attached to the separation roller 2104. The torque of the torque limiter is such a value that when there is only one document between the rollers 2103 and 2104, the separation roller 2104 rotates following the feed roller 2103 because of the friction with the document fed by the feed roller 2103. When a plurality of documents come between the rollers 2103 and 2104, the separation roller 2104 stops and prevents the documents other than the uppermost from traveling forward.

Feeding of a Document

A set of documents are placed on the document tray 2101 with the first page facing up. When an operator presses a copy start key 506 (see FIG. 3) (in feeding the first document) or when an actuator lever 2106 is pressed by a document, thereby making an empty sensor SE1 detect the presence of a document (in feeding the second or the succeeding document), the pick-up roller 2102 is driven to rotate counterclockwise at a specified time, whereby documents are fed to the right in FIG. 2.

The picked-up documents are preliminarily separated by the pre-separating guide tab 2110a, and the feed roller 2103 and the separation roller 2104 allow only one document to pass through the nip portion.

The succeeding feeding processes are described separately with respect to a simplex document and with respect to a duplex document.

Simplex Document Mode

The only one document which has passed through the nip portion between the rollers 2103 and 2104 is next transported by the intermediate transport rollers 2105. When a specified time passes after the leading edge of the document is detected by a register sensor SE2, that is, when the leading portion of the document makes a loop of a proper size by colliding with the nip portion of the first read rollers 2201, the intermediate transport rollers 2105 are stopped from rotating. Thereby, the leading edge of the document is regulated by the nip portion of the first read rollers 2201, and possible skew of the document is corrected.

Then, the read rollers 2201 and 2203 are driven to rotate, whereby the document is fed on the slid glass 198 pressed by the guide plate 2202. Meanwhile, the image of the document is read by the reading optical system 11. The rotation of the intermediate transport rollers 2105 is continued until the trailing edge of the document passes the nip portion between the rollers 2105.

The document is further transported from the second read rollers 2203 to the left guided by the lower surfaces of the diverters 2301 and 2401. Then, the document is discharged onto the discharge tray 2502 through the discharge rollers 2501 with its imaged-side facing down. Based on the detection of the trailing edge of the document by a sensor SE6, feeding of the next document is started.

The speed of rotation of the read rollers 2201 and 2203 is altered in accordance with the copying magnification, and accordingly, the speed of rotation of the intermediate transport rollers 2105 is altered. If the copying magnification is m and if the transport speed of the read rollers 2201 and 2203 to attain a copying magnification of 1 is V (which is equal to the circumferential speed of the photosensitive drum 121), the transport speed of the read rollers 2201 and 2203 is automatically set to V/m. In the SADF mode and the thin paper document mode, the transport speed of the read rollers 2201 and 2203 is set to a specified value regardless of the copying magnification. This will be described in detail later.

The reading optical system 11 starts image reading a specified time after a read sensor SE14 located right after the first read rollers 2201 detects the leading edge of a document. More specifically, the running amount of the drive motor of the read rollers 2201 and 2203 since the detection of the leading edge of the document by the sensor SE14 is monitored, thereby timing the start of image reading to the arrival of the leading edge of the document at the reading position 190.

Manual Feeding, SADF Mode

The manual feed port 2602 is located upstream of the first read rollers 2201, and is opened by laying the manual feed tray 2601 outward. Then, an operator inserts a document in the port 2602 until the leading edge of the document comes into contact with the nip portion between the first read rollers 2201, and the read rollers 2201 and 2203 are driven to rotate. Thereby, the document is fed on the slit glass 198, and the image of the document is read in the same manner as described with respect to a simplex document. The rotation of the read rollers 2201 and 2203 is started at a specified time after the register sensor SE2 detects the leading edge of the document.

The manual feed tray 2601 is of exclusive use for the SADF mode. In the SADF mode, documents of thin paper such as slips or duplicates are set on the tray 2601 one by one, and every time a document is set on the tray 2601, the document is automatically fed. Because thin paper documents are apt to be damaged, the manual feed port 2602 is formed in such a position that a document can be fed to the reading position 2200 as straight as possible. By the same reason, when the copying magnification is smaller than 1, the speed of transporting a thin paper document is set to a specified speed regardless of the copying magnification. Further, a sensor SE20 is provided in the manual feeding section 2600 so as to detect the open/closed state of the feed tray 2601, and execution of the SADF mode is commanded in response to a signal sent from the sensor SE20 indicating the open state of the tray 2601.

Duplex Document Mode

A duplex document fed from the document tray 2101 is transported on the slit glass 198 by the read rollers 2201 and 2203 in the above-described manner, and meanwhile the image on a first side of the document is read. At this time, the diverter 2301 is set in a position slightly clockwise from the position shown by the slid line in FIG. 2. Accordingly, the document whose first side has been subjected to image reading is guided to the circulation inversion rollers 2302 by an inclined surface of the diverter 2301. When the trailing edge of the document has passed the resin film 2304, the inversion rollers 2302 are driven to rotate in reverse, whereby the document is fed into the circulating path 2310 with its leading edge trailing. Thereafter, the document is fed to the first read rollers 2201 upside down. Then, the leading edge of the document comes to the nip portion of the stationary first read rollers 2201, and when the leading portion makes a loop, the rotation of the inversion rollers 2302 is stopped. With this operation, the leading edge of the document is aligned, and possible skew of the document is corrected.

Thereafter, the read rollers 2201 and 2203 are driven to rotate, whereby the document is transported on the slit glass 198 with its second side facing down, and meanwhile, the image on the second side is read. At this time, the diverter 2301 is back in the position shown by the solid line in FIG. 2, and the diverter 2401 is set in a position slightly clockwise from the position shown by the solid line in FIG. 2. Accordingly, the document whose second side has been subjected to image reading is guided by the lower surface of the diverter 2301 and the upper surface of the diverter 2401 to the discharge inversion rollers 2402. When the trailing edge of the document has passed the resin film 2403, the rotation of the discharge inversion rollers 2402 is reversed. Thereby, the document is inverted upside down and with leading edge trailing, and is discharged onto the discharge tray 2502 through the discharge rollers 2501 guided by the resin film 2403. In this way, the document is discharged onto the discharge tray 2502 with its first side facing down, resulting in collation of a set of duplex documents. In this duplex document mode, when the trailing edge of a document is detected by the register sensor SE2 during image reading of its second side, feeding of the next document is started.

The automatic document feeder 20 executes an operation in the simplex document mode or the duplex document mode according to the selection by an operator. When a plurality of documents are set on the tray 2101, the automatic document feeder 20 feeds and transports the documents one by one in the above-described manner. When the number registered by the operator (the number of copy sets to be made) is two or more, the reading optical system 11 stores image data in a memory, and the registered number of copies are made from the data.

Document Feed Speed

When a document set on the document tray 2101 is to be copied, the document is fed at a speed of V/m (V is the system speed which is equal to the circumferential speed of the photosensitive drum 121, and m is the registered copying magnification), and the image processing section 12 outputs image data read from the document as print data to the laser optical unit 13 without executing conversion of the copying magnification. For example, when the system speed V is 320 mm/s, if the copying magnification m is 1.0, the document feed speed is set to 320 mm/s. In this case, if the copying magnification is 0.5, the document feed speed is set to 640 mm/s.

In the SADF mode of copying a thin paper document using the manual feed tray 2601, if the registered copying magnification is 1.0 or more, the document is fed at a speed in accordance with the copying magnification. This will not damage the thin paper document. However, when the copying magnification is less than 1.0, a thin paper document is fed at a speed for a copying magnification of 1.0, regardless of the registered copying magnification. In this way, high-speed feeding of a thin paper document is avoided so that the load applied from the read rollers 2201 and 2203 to the thin paper document will not be large. Because image data which are read while the document is fed in this way do not have a correct magnification in the sub scanning direction, the image processing section 12 corrects the data with respect to magnification and outputs the corrected data as print data.

Further, it is preferred that operation in the duplex document mode is inhibited when a thin paper document is to be copied. The range of copying magnification in which the document feed speed is set lower is not limited to the range less than 1.0 and can be determined according to the model of the copying machine. Moreover, the document feed speed which is set regardless of the copying magnification within the range is not limited to the speed for a copying magnification of 1.0 and can be determined in consideration for the load onto a thin paper document.

Further, when a document feed speed comes extremely high, there is also fear that any document other than thin paper document may be damaged. Therefore, it is proper to set the document feed speed lower for copying of an ordinal document when copying magnification is smaller than a specified value, like an case of copying a thin paper document as explained above, then have the image processing section correct the magnification in the sub scanning direction.

Operation Panel

Figure 3:
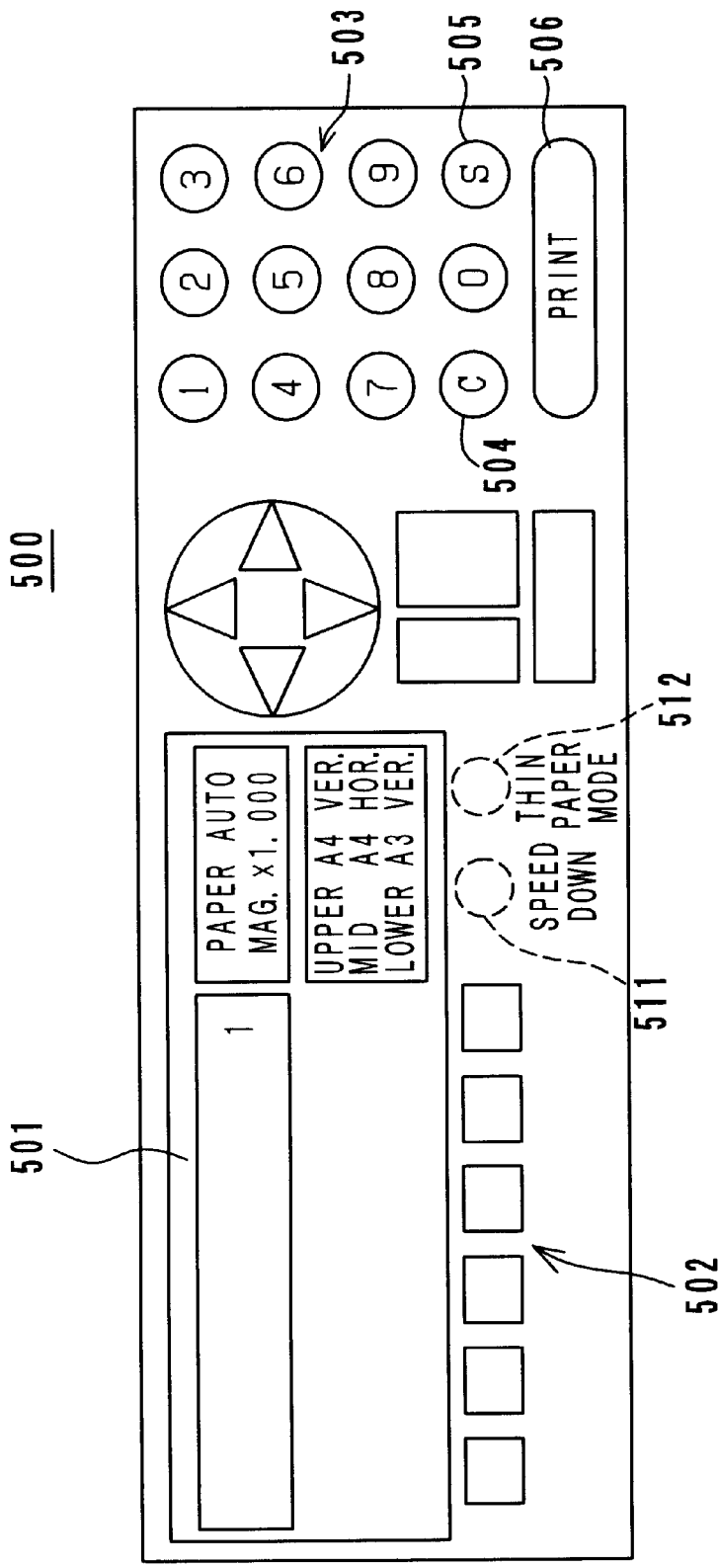
FIG. 3 is a plane view of an operation panel.

FIG. 3 shows an operation panel 500 provided on the copying machine 10. On the operation panel 500, there are provided a liquid crystal display panel 501, a selection key 502 for switching the picture on the display panel 501, a ten-key 503 for inputting the number of copy sets to be made, etc., a clear key 504, a stop key 505, a copy start key 506, etc.

Image Processing Section and Control Section

Figure 4:
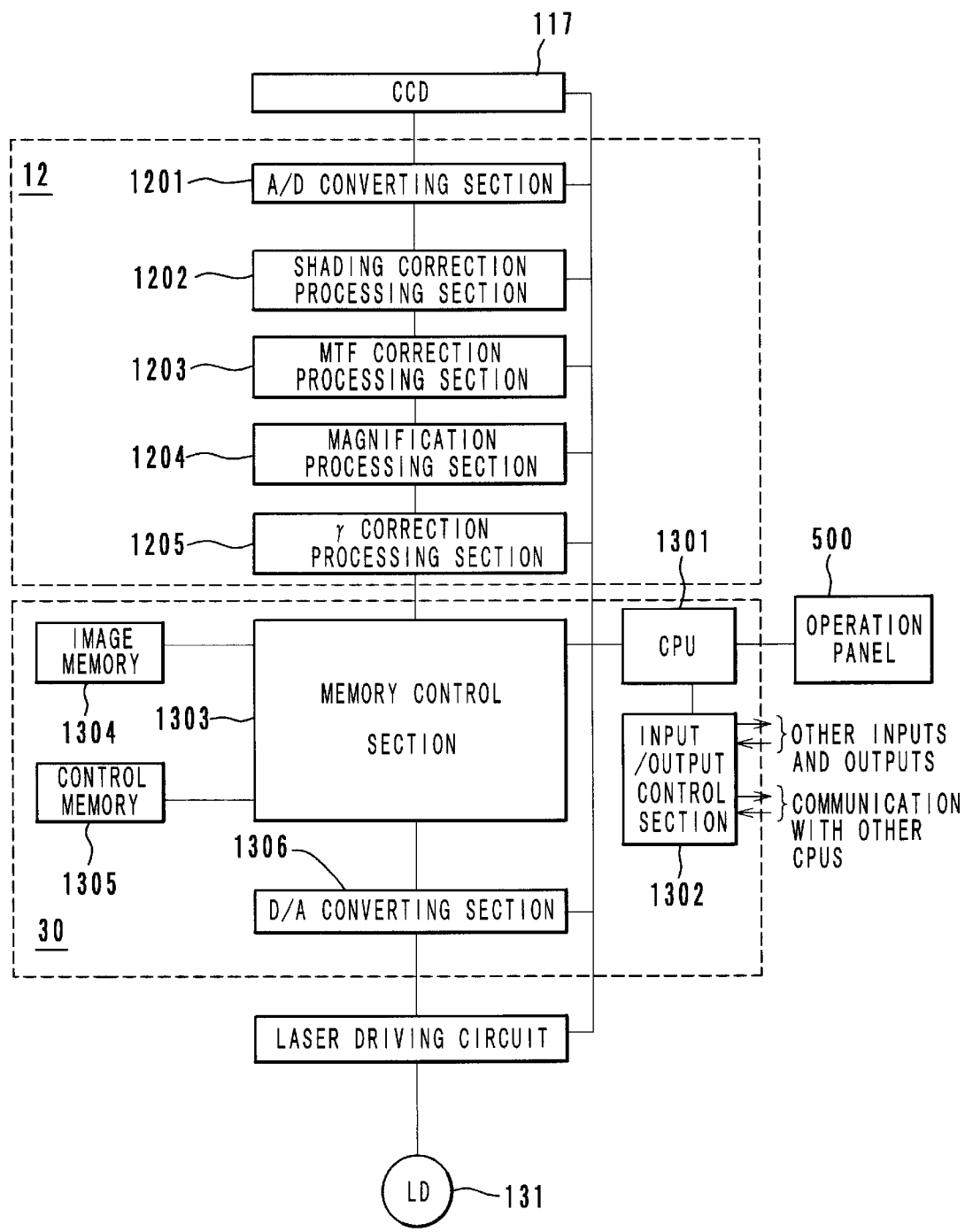
FIG. 4 is a block diagram which shows an image processing section and a control section.

FIG. 4 shows the image processing section 12 and the control section 30. The image processing section 12 comprises an A/D converting section 1201, a shading correction processing section 1202, an MTF correction processing section 1203, a magnification processing section 1204 and a γ correction processing section 1205. The A/D converting section 1201 makes the waveform of an analog image signal read by the CCD sensor 117 in shape (eliminates noise) and converts the signal into eight-bit digital image data. The shading correction processing section 1202 corrects variations in sensitivity among the elements of the CCD sensor 117, variations in luminosity made by the lamp 112, variations in focus of the lens 116, etc., and converts the image data so as to attain a proper density. The MTF correction processing section 1203 suppresses noise in image density, and makes corrections to the image data so as to attain smooth gradation and to emphasize the edges of thin line portions for improvement in reproducibility. The magnification processing section 1204 processes the image data for magnification or reduction in accordance with the registered copying magnification. In the SADF mode, image data are processed in this section 1204 so that the registered copying magnification can be attained. Further, the magnification processing section 1204 executes processing for transfer of an image, processing for formation of a mirror image, processing for repetition, processing for data interpolation, etc. The γ correction processing section 1205 corrects the tone characteristic.

The control section 30 comprises a CPU 1301 with an input/output control section 1302, a memory control section with an image memory 1304 and a control memory 1305, and a D/A converting section 1306. The control section 30 is a well-known type, and the description thereof is omitted.

Control Procedure

Figure 5:
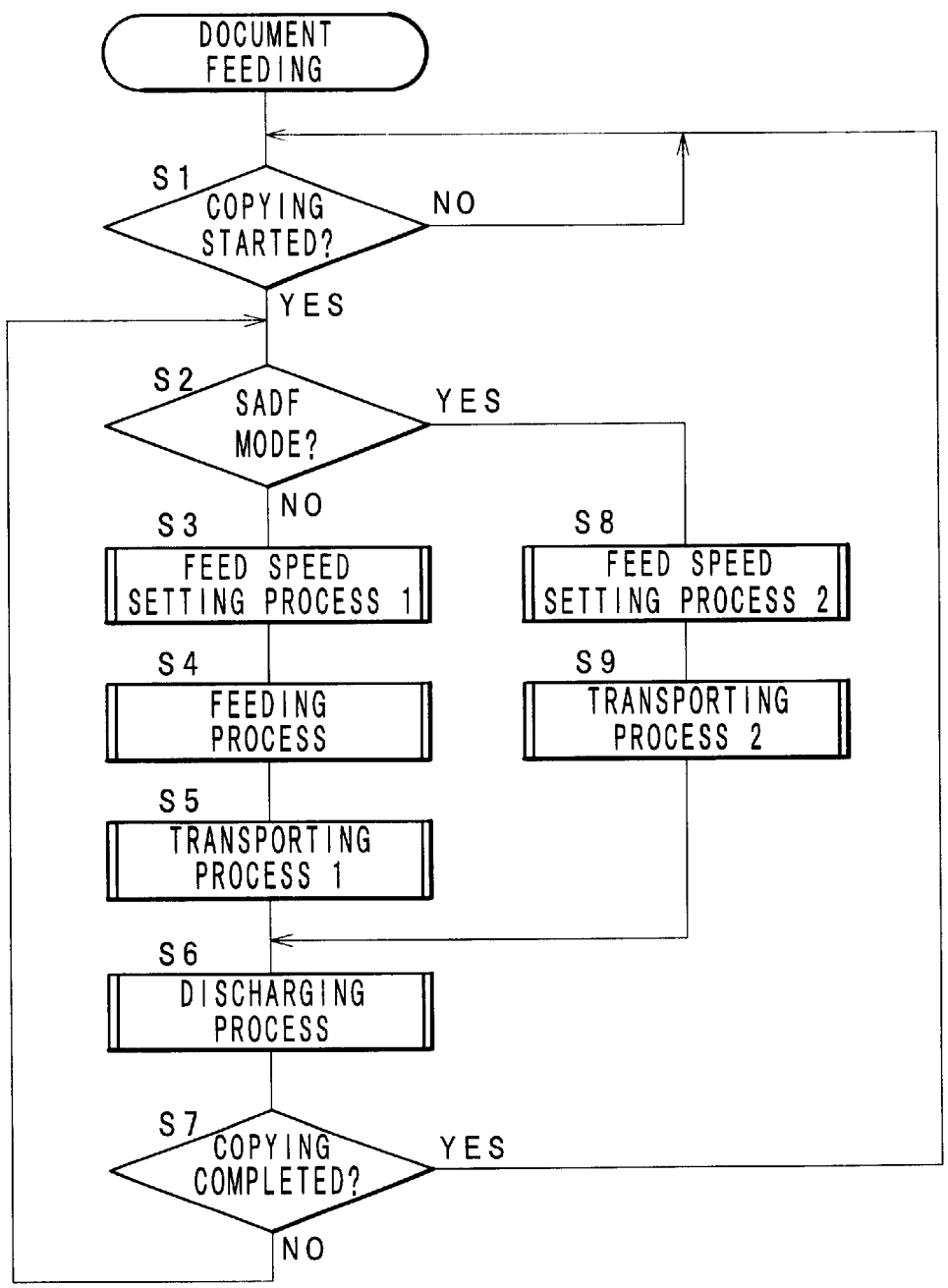
FIG. 5 is a flowchart which shows a control procedure for feeding a document.
Figure 6:
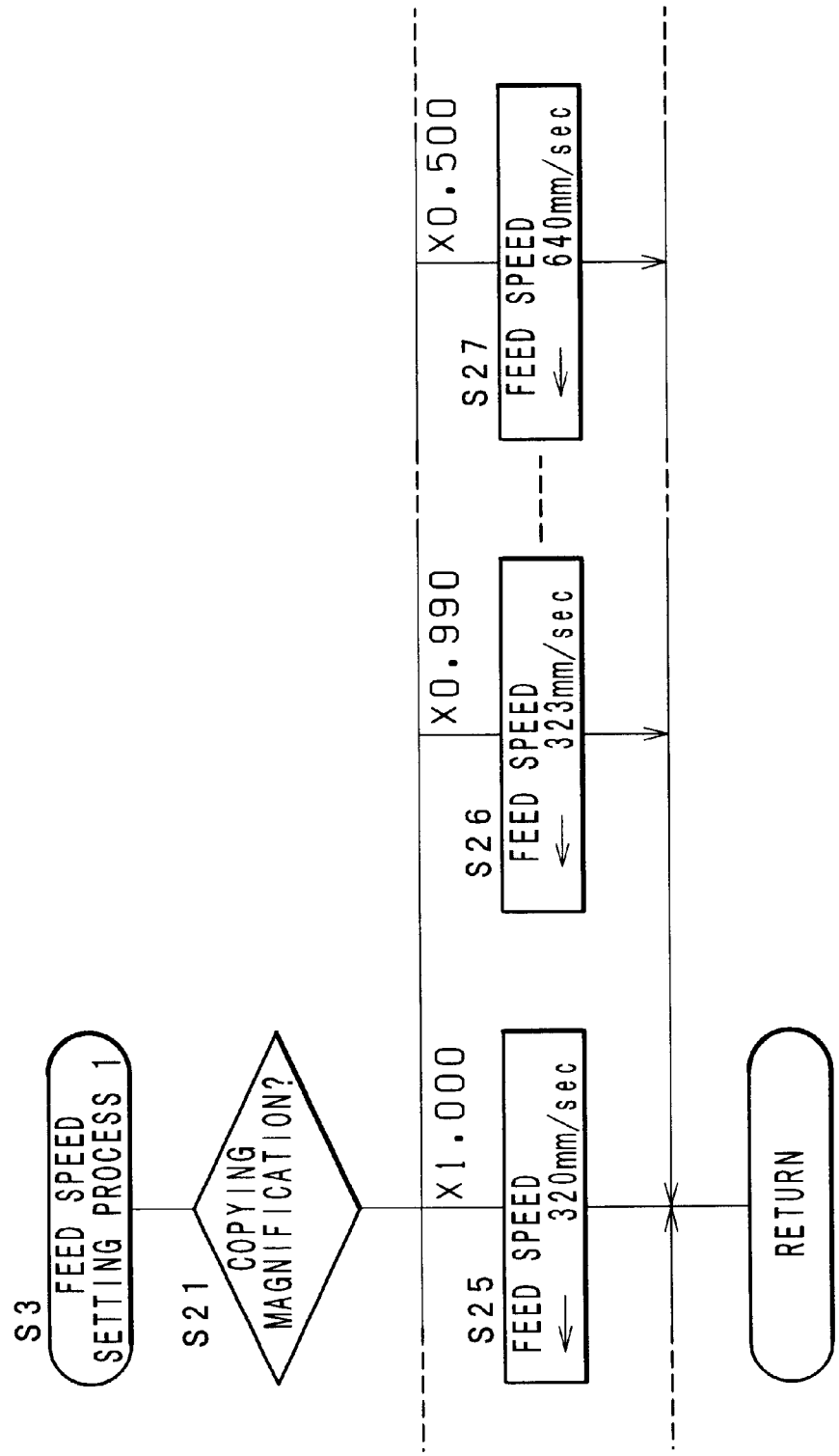
FIG. 6 is a flowchart which shows a procedure for a feed speed setting process 1.
Figure 7:
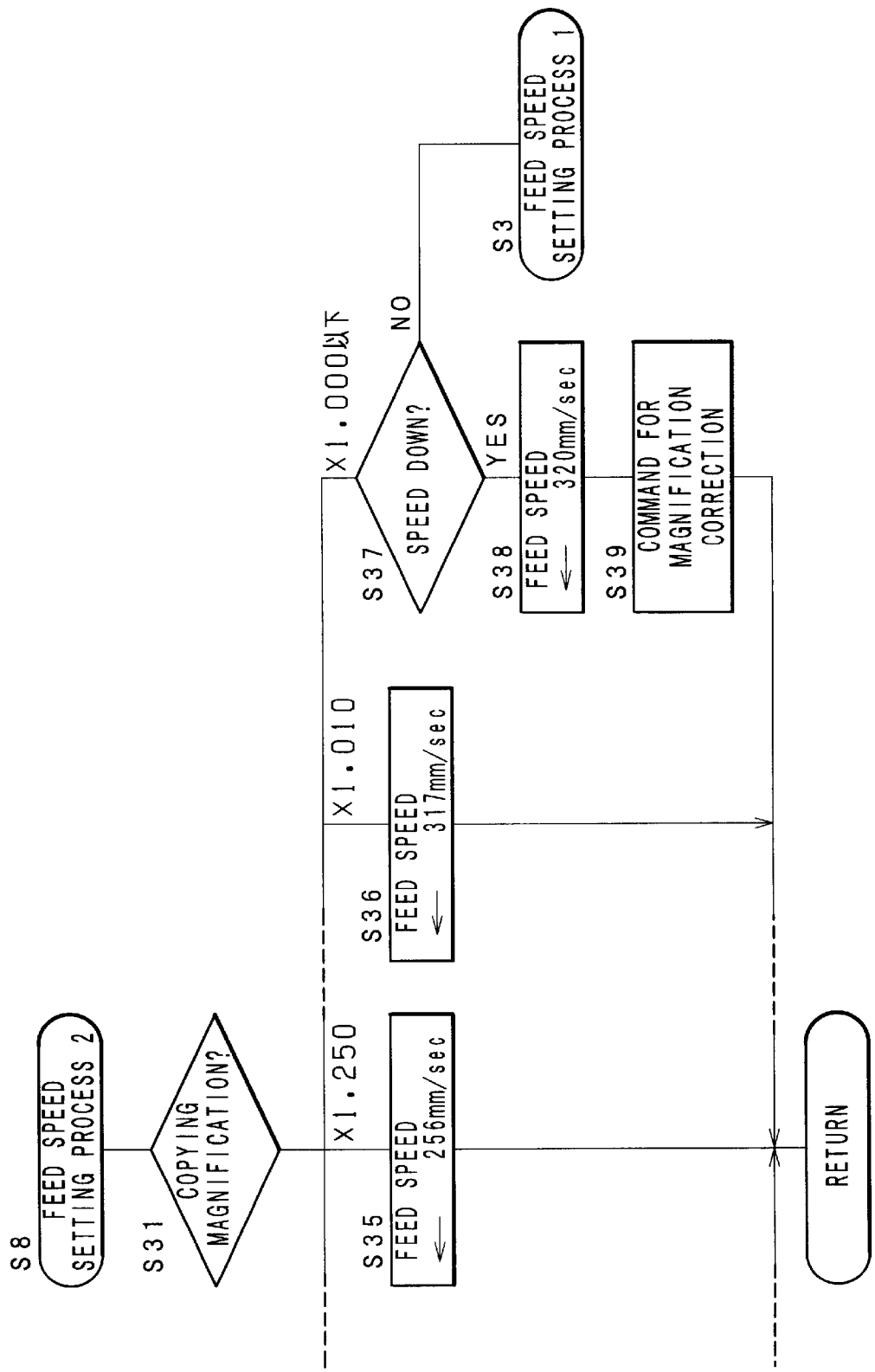
FIG. 7 is a flowchart which shows a procedure for a feed speed setting process 2.

FIGS. 5, 6 and 7 show the document feeding procedure of the document feeder 20. Here, only the part which relates to the present invention is described.

As FIG. 5 shows, first, when a start of copying operation is confirmed at step S1, it is judged at step S2 whether the SADF mode is selected. When the sensor SE20 detects the tray 2601 pulled open by an operator, selection of the SADF mode is judged. If the SADF mode is not selected, a feed speed setting process 1 is executed at step S3. Subsequently, a document feeding process by the feeding section 2000 is executed at step S4, and a transporting process 1 by the reading section 2200 is executed at step S5. Then, a discharging process by the discharging section 2500 is executed at step S6. Additionally, according to the selected document feed mode, document transporting processes by the circulation inverting section 2300 and the discharge inverting section 2400 are executed.

On the other hand, if the SADF mode is selected, a feed speed setting process 2 is executed at step S8, and a transporting process 2 by the reading section 2200 is executed at step S9. Then, the program goes to step S6.

Next, the completion of copying operation is judged at step S7. If the copying operation has not been completed, the program returns to step S2, and on the completion, the program goes to step S1.

FIG. 6 shows a subroutine for the feed speed setting process 1 carried out at step S3. This process is carried out when a mode other than the SADF mode is selected. In other words, this is a process to set the feed speed to V/m. The following description is about a case in which the system speed V is 320 mm/sec.

First, the registered copying magnification is confirmed at step S21, and then, the feed speed is set according to the copying magnification. If the copying magnification is 1.00, the feed speed is set to 320 mm/sec at step S25. If the copying magnification is 0.990, the feed speed is set to 323 mm/sec at step S26. If the copying magnification is 0.500, the feed speed is set to 640 mm/sec at step S27.

FIG. 7 shows a subroutine for the feed speed setting process 2 carried out at step S8. This is a process to set the feed speed when a thin paper document is to be copied in the SADF mode.

First, the registered copying magnification is confirmed at step S31, and if the copying magnification is larger than 1.000, the feed speed is set according to the copying magnification. For example, if the copying magnification is 1.250, the feed speed is set to 256 mm/sec at step S35, and if the copying magnification is 1.010, the feed speed is set to 317 mm.sec at step S36. On the other hand, if the registered copying magnification is 1.000 or less, the operator's intention to set the feed speed in this process is confirmed at step S37, and the feed speed is set to 320 mm/sec at step S38. If the feed speed setting in this process is not demanded, the program goes to step S3 to set the feed speed according to the copying magnification.

In this procedure, it is possible to select a mode wherein the feed speed is not lowered even in the SADF mode so that the productivity can be prior to the prevention of damage on the thin paper document. In order to enable the operator to select this mode, a selection key 511 is provided on the operation panel shown by FIG. 3. Only when the key 511 is turned on, the mode of protecting a thin paper document is selected. If the key 511 is not provided, step S37 is eliminated from the procedure carried out in the SADF mode of feeding documents through the manual port 2600. When the feed speed is set lower than the speed in accordance with the copying magnification, at step S39, a command for correction of image data with respect to magnification is sent to the image processing section 12.

Other Modes of Feeding a Thin Paper Document

In the above-described embodiment, a thin paper document is fed through the manual feed tray 2601. Additionally, the embodiment can be so modified that a thin paper document can be fed from the document tray 2101. In this case, in order to execute the process at step S8, input means for sending information that the document to be fed from the tray 2101 is thin paper to the CPU 1301 is required.

As the input means, a thin paper mode selection key 512 is provided on the operation panel 500 shown by FIG. 3. Otherwise, the feeding section 2100 may be modified as shown by FIG. 8. A document guide plate 2120 with a recess 2120a is provided, and a detection lever 2121 is provided in such a position that the edge of the lever 2121 comes to the recess 2120a. A transmitting type sensor SE21 is provided in such a position that the light is cut by a corner 2121a of the detection lever 2121. The detection lever 2121 freely pivots on a pin 2122 and comes into the recess 2120a by its own weight. In this state, the light of the sensor SE21 is interrupted by the corner 2121a. When a document fed from the tray 2101 is traveling on the guide plate 2120, if the document has an ordinary thickness, the document pushes the edge of the lever 2121 upward, whereby the corner 2121a retreats from the optical axis of the sensor SE21. In this way, it is judged that the fed document is ordinarily thick. However, if the fed document is thin paper, the document is pressed by the edge of the lever 2121 and travels along the recess 2120a. Accordingly, the lever 2121 does not pivot, and the optical axis of the sensor SE21 is kept interrupted by the corner 2121a. In this way, it is judged that the document is thin paper.

Figure 9:
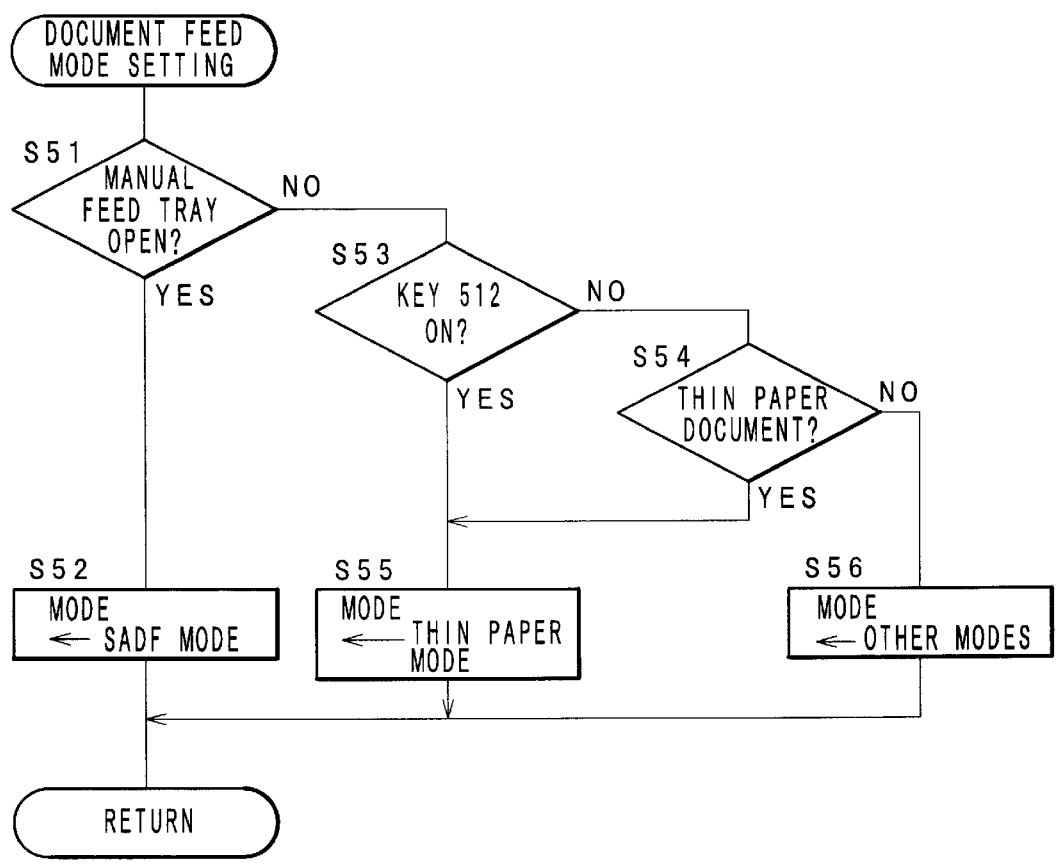
FIG. 9 is a flowchart which shows a procedure for a document feed mode setting process.

FIG. 9 shows a procedure for document feed mode setting in a case of using both the thin paper mode selection key 512 and the detection lever 2121 in addition to the SADF mode.

First, at step S51, the open/closed state of the manual feed tray 2601 is judged from the on/off state of the sensor SE20. If the manual feed tray 2601 is open, the SADF mode is set at step S52. If the tray 2601 is closed, the thin paper mode selection key 512 is checked at step S53. If the key 512 is on, the thin paper mode is set at step S55. If the key 512 is not on, at step S54 it is judged from the on/off state of the sensor SE21 whether a thin paper document is detected. If a thin paper document is detected, the thin paper mode is set at step S55. If the judgments at steps S51, S53 and S54 are all "NO", another mode is set at step S56.

When the SADF mode or the thin paper mode is set at step S52 or S55, the subroutine for the feed speed setting process 2 shown by FIG. 7 is executed.

The following arrangement is also possible. A sensor for detecting a document inserted in the manual feed port 2600 is provided, and when this sensor detects a document in addition to detection of the open state of the manual feed tray 2601 at step S51, the program goes to step S52. Further, it is possible to provide the thin paper detection mechanism shown by FIG. 8 in the manual feeding section 2600.

The copying machine may have any structure. Also, the automatic document feeder may have any structure as long as it is of the document-feed image reading type.

The embodiment explained above has an arrangement where a load applied to a document is lightened by transporting a document at a lower speed than a speed corresponding to the copying magnification. However, if the copying magnification is within the range where a load to a document is permissibly small, it is possible, contrary to the embodiment above, to set a document feed speed higher than the speed corresponding to the copying magnification; which is more productive. And then, in this case too, the magnification in the sub scanning direction can be corrected by the image processing section, and an image is reproduced correctly.

Although the present invention has been described in connection with the preferred embodiment, it is to be noted that various changes and modifications are possible to those who are skilled in the art. Such changes and modifications are to be understood as being within the scope of the invention.

What is claimed is:

1. A digital copying system comprising:
   an automatic document feeder for feeding a document set on a tray to a specified reading position;
   an image reader for reading an image of the document fed by the automatic document feeder at the reading position;
   an image processor for carrying out digital processing toward data read by the image reader to produce print data;
   an image forming device for forming an image on a sheet in accordance with the print data produced by the image processor to reproduce the image of the document;
   a magnification setting device for setting a copying magnification; and
   a controller which controls the automatic document feeder to operate in a first document feed mode to feed a document on the reading position at a speed to achieve the set copying magnification and in a second document feed mode to feed a document on the reading position at a speed different from the speed to achieve the set copying magnification while the image reader reads the image of the document.

2. A digital copying system as claimed in claim 1, wherein in the second document feed mode, the automatic document feeder is controlled by the controller to feed a document at a speed to achieve the set copying magnification when the set copying magnification is within a first range and to feed a document at a speed lower than the speed to achieve the set copying magnification when the set copying magnification is within a second range.

3. A digital copying system as claimed in claim 1, wherein when image reading is carried out while a document is being fed at a speed different from the speed to achieve the set copying magnification, the image processor carries out processing to produce print data which have information to make the image forming device form an image of the set copying magnification.

4. A digital copying system as claimed in claim 1, wherein in the second document feed mode, every time a document is set on a tray, the automatic document feeder automatically feeds the document to the reading position.

5. A digital copying system as claimed in claim 1, further comprising a detector for detecting whether a document is a thin paper or not;
   wherein, the controller controls the automatic document feeder to operate in the second document feed mode when the document is detected to be thin paper.

6. A digital copying system as claimed in claim 1, further comprising an input device which enables an operator to command execution of the second document feed mode.

7. An image reading apparatus comprising:
   a document feeder for feeding a document to a specified reading position;
   an image reader for reading an image of the document fed by the document feeder at the reading position;
   an image processor for carrying out digital processing toward data read at the image reader to produce print data;
   a magnification setting device for setting a copying magnification; and
   a controller which selects either a first document feed mode where a document is fed at a speed to achieve a set copying magnification or a second document feed mode where a document is fed at a speed different from the speed to achieve the set copying magnification, and which controls the document feeder to feed a document at a speed corresponding to a selected document feed mode while the image reader reads the image of the document.

8. An image reading apparatus as claimed in claim 7 wherein when an image of a document fed in the second document feed mode is read, the image processor carries out processing to produce print data which have information to make an image forming device form an image of the set copying magnification.

9. An image reading apparatus as claimed in claim 7 wherein the controller selects the second document feed mode when a copying magnification set by the magnification setting device is smaller than a specified magnification, and a document is fed at a specified speed lower than a speed corresponding to the copying magnification.

10. An image reading apparatus as claimed in claim 7 further comprising an device for inputting a command whether a document feed speed is changed or not, wherein the controller sets the document feed mode in accordance with a signal from the input device.

* * * * *